United States Patent
Curtis et al.

(10) Patent No.: US 12,251,286 B2
(45) Date of Patent: Mar. 18, 2025

(54) DEVICE FOR APPLYING EMULSION COMPOSITIONS

(71) Applicant: The Procter & Gamble Company, Cincinnati, OH (US)

(72) Inventors: Michael David Curtis, Cincinnati, OH (US); Jennifer Marie Hasse, Cincinnati, OH (US); Niranjan Ramji, Mason, OH (US); Paul Albert Sagel, Maineville, OH (US); Joe Leon Washington, III, Cincinnati, OH (US); Laura Ashley Willis, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/639,216

(22) Filed: Apr. 18, 2024

(65) Prior Publication Data

US 2024/0261078 A1    Aug. 8, 2024

Related U.S. Application Data

(63) Continuation of application No. 16/898,469, filed on Jun. 11, 2020, now abandoned.
(Continued)

(51) Int. Cl.
*A61C 19/06* (2006.01)
*A46B 9/00* (2006.01)
(Continued)

(52) U.S. Cl.
CPC ............ *A61C 19/066* (2013.01); *A46B 9/005* (2013.01); *A46B 9/02* (2013.01); *A46B 11/0024* (2013.01);
(Continued)

(58) Field of Classification Search
CPC ....... A61C 19/066; A61C 3/005; A46B 9/005; A46B 9/02; A46B 11/0024;
(Continued)

(56) References Cited

U.S. PATENT DOCUMENTS

| | | | | |
|---|---|---|---|---|
| 1,382,587 A | * | 6/1921 | Morse | A46B 9/005 15/210.1 |
| 1,475,102 A | * | 11/1923 | Morse | A46B 9/005 15/225 |

(Continued)

FOREIGN PATENT DOCUMENTS

| CN | 1067367 A | 12/1992 |
|---|---|---|
| CN | 1328425 A | 12/2001 |

(Continued)

OTHER PUBLICATIONS

All Office Actions; U.S. Appl. No. 18/791,928, filed Aug. 1, 2024.
(Continued)

*Primary Examiner* — Heidi M Eide
*Assistant Examiner* — Holly T. To
(74) *Attorney, Agent, or Firm* — Elizabeth A. Conklin

(57) ABSTRACT

An applicator for the application of an oral care composition to an oral cavity. The applicator may include an applicator tip and an applicator handle detachably or non-detachably connected to a proximal end of the applicator tip. The applicator tip may include an external ridge, a plurality of internal ridges, and a plurality of internal channels between the plurality of internal ridges.

19 Claims, 9 Drawing Sheets

Related U.S. Application Data

(60) Provisional application No. 62/957,363, filed on Jan. 6, 2020, provisional application No. 62/861,357, filed on Jun. 14, 2019.

(51) Int. Cl.
  *A46B 9/02* (2006.01)
  *A46B 11/00* (2006.01)
  *A61C 3/00* (2006.01)

(52) U.S. Cl.
  CPC ...... *A61C 3/005* (2013.01); *A46B 2200/1046* (2013.01)

(58) Field of Classification Search
  CPC .............. A46B 2200/1046; A46B 9/06; A46B 15/0069; A46B 15/0075; A46D 1/0207; A61B 17/244
  USPC .......................... 433/215; 601/138, 139, 141
  See application file for complete search history.

(56) References Cited

U.S. PATENT DOCUMENTS

| | | | | |
|---|---|---|---|---|
| 1,526,267 A * | 2/1925 | Morland | ................ | A46B 9/005 156/227 |
| 1,707,118 A * | 3/1929 | Goldberg | ............... | A46B 9/045 601/141 |
| 1,729,168 A * | 9/1929 | Knapp | ..................... | A46B 7/04 15/210.1 |
| 1,734,429 A * | 11/1929 | Hanover | ................ | A46B 9/005 15/186 |
| 1,891,864 A * | 12/1932 | Barrett | ................ | A61B 17/244 606/161 |
| 1,892,068 A * | 12/1932 | Metzler | ................. | A61H 13/00 601/139 |
| 1,903,161 A * | 3/1933 | Barkan | .................... | A46B 5/00 601/141 |
| 1,993,662 A * | 3/1935 | Green | ...................... | A46B 9/04 15/167.1 |
| 2,092,438 A * | 9/1937 | Wilt | ....................... | A46B 9/005 15/210.1 |
| 2,099,030 A | 11/1937 | Morrison | | |
| 2,219,753 A * | 10/1940 | Seguin | ................... | A46B 7/04 15/167.1 |
| 2,265,102 A * | 12/1941 | Cressler | ................ | A46B 9/005 15/167.1 |
| 2,476,201 A * | 7/1949 | Ligoure | ................ | A46B 9/005 15/207.2 |
| 2,545,814 A * | 3/1951 | Kempster | .............. | A61H 13/00 15/167.1 |
| 2,548,255 A * | 4/1951 | Cressler | ................ | A46B 9/005 401/268 |
| 2,599,191 A * | 6/1952 | Meunier | ................ | A46B 9/005 15/186 |
| 2,604,105 A * | 7/1952 | Kruck | .................... | A45D 40/26 132/320 |
| 2,783,491 A * | 3/1957 | Bellam | ................. | A46B 9/005 15/210.1 |
| 3,029,809 A * | 4/1962 | Madlung | ............ | A46B 15/0055 15/244.1 |
| 3,059,262 A | 10/1962 | Marschner | | |
| 3,335,718 A * | 8/1967 | Sexton | ................... | A61H 13/00 601/139 |
| 3,491,396 A * | 1/1970 | Granieri, Jr. | ........... | A46B 3/005 15/104.94 |
| 4,083,078 A * | 4/1978 | Shimizu | ................ | A61H 13/00 15/244.1 |
| 4,368,272 A * | 1/1983 | Kashket | ................ | A46B 9/005 15/210.1 |
| 4,384,382 A * | 5/1983 | Diamant | .................. | A46D 1/00 15/247 |
| 4,610,043 A * | 9/1986 | Vezjak | ................. | A61B 17/244 606/161 |
| 5,040,981 A | 8/1991 | Oliva | | |
| 5,226,197 A * | 7/1993 | Nack | ................... | A46B 15/0055 15/160 |
| 5,240,415 A | 8/1993 | Haynie | | |
| D377,417 S | 1/1997 | Gupta | | |
| D389,579 S | 1/1998 | Khandkar et al. | | |
| 5,735,864 A * | 4/1998 | Heisinger, Jr. | ........ | A61B 17/244 606/161 |
| 5,766,193 A * | 6/1998 | Millner | ................ | A61B 17/244 606/162 |
| 5,792,159 A * | 8/1998 | Amin | .................... | A61B 17/244 D24/146 |
| 5,816,270 A | 10/1998 | Nadel | | |
| 5,816,804 A | 10/1998 | Fischer | | |
| D406,891 S | 3/1999 | Smith | | |
| 5,984,935 A * | 11/1999 | Welt | ..................... | A61B 17/244 606/161 |
| 6,032,315 A * | 3/2000 | Liebel | ................ | A46B 15/0055 15/160 |
| 6,067,684 A * | 5/2000 | Kweon | .................... | A46B 7/04 15/207.2 |
| 6,145,153 A | 11/2000 | Weihrauch | | |
| 6,205,611 B1 * | 3/2001 | Vigil | ................... | A46B 11/0003 206/439 |
| D447,238 S * | 8/2001 | Tang | ............................. | D4/110 |
| 6,331,085 B1 | 12/2001 | Schrepf et al. | | |
| 6,463,619 B2 * | 10/2002 | Gavney, Jr. | ............. | A47L 17/06 15/245 |
| 6,792,642 B2 * | 9/2004 | Wagstaff | ............ | A46B 15/0055 15/160 |
| 6,805,557 B2 * | 10/2004 | Davies | ..................... | A46B 9/06 15/207.2 |
| 6,820,299 B2 * | 11/2004 | Gavney, Jr. | .............. | A47L 13/11 15/117 |
| D536,452 S * | 2/2007 | Geiberger | ..................... | D24/147 |
| D566,892 S | 4/2008 | Anderson et al. | | |
| 7,475,692 B2 | 1/2009 | Hartstock et al. | | |
| D592,405 S | 5/2009 | Moskovich | | |
| D638,628 S * | 5/2011 | Nanda | ........................... | D24/147 |
| 8,281,446 B2 | 10/2012 | Moskovich | | |
| 8,316,863 B2 | 11/2012 | De Laforcade et al. | | |
| 8,549,693 B2 * | 10/2013 | Gruber | ................... | A46B 9/005 15/176.4 |
| 8,628,263 B2 | 1/2014 | Hohlbein et al. | | |
| 9,072,570 B2 | 7/2015 | Maurat | | |
| D876,012 S | 2/2020 | Ko | | |
| 10,568,725 B2 * | 2/2020 | Sedic | ..................... | A61C 17/22 |
| 10,780,032 B1 | 9/2020 | Rajaiah et al. | | |
| 10,905,599 B2 * | 2/2021 | Booth | ................... | A61F 13/385 |
| 11,039,847 B2 * | 6/2021 | Georgi | ................. | A61C 17/084 |
| 11,064,786 B2 | 7/2021 | Böhm et al. | | |
| D945,618 S * | 3/2022 | Ramon Martinez | ............. | D28/8 |
| D953,531 S * | 5/2022 | Ramon Martinez | ......... | D24/147 |
| 2001/0029960 A1* | 10/2001 | Asano | .................... | A45D 24/22 132/116 |
| 2002/0124337 A1* | 9/2002 | Calabrese | ........... | A46B 15/0032 15/167.1 |
| 2003/0163149 A1* | 8/2003 | Heisinger, Jr. | ........ | A61B 17/244 606/161 |
| 2003/0196283 A1* | 10/2003 | Eliav | ....................... | A46B 9/06 601/142 |
| 2005/0097693 A1* | 5/2005 | Bransky | ................. | A46B 9/005 15/167.1 |
| 2005/0217691 A1* | 10/2005 | Petit | ....................... | A46B 9/021 132/320 |
| 2005/0233279 A1 | 10/2005 | Zeh et al. | | |
| 2005/0241091 A1* | 11/2005 | Foster | .................... | A46B 9/005 15/167.1 |
| 2007/0169790 A1* | 7/2007 | Castagno | ................ | A46B 9/005 132/320 |
| 2008/0145138 A1* | 6/2008 | Bencsics | ................ | E04F 21/163 401/265 |
| 2008/0145318 A1 | 6/2008 | Midha | | |
| 2008/0208228 A1 | 8/2008 | Mueller | | |
| 2009/0023106 A1 | 1/2009 | Jacobs | | |

(56) References Cited

U.S. PATENT DOCUMENTS

| | | | |
|---|---|---|---|
| 2009/0196677 A1 | 8/2009 | Wright | |
| 2010/0064459 A1* | 3/2010 | Varner | A46B 9/005 |
| | | | 15/207.2 |
| 2010/0240003 A1* | 9/2010 | Fritze | A61C 19/063 |
| | | | 433/80 |
| 2011/0045030 A1 | 2/2011 | Desai et al. | |
| 2011/0146013 A1* | 6/2011 | Yun | A46B 5/0095 |
| | | | 15/160 |
| 2011/0168198 A1* | 7/2011 | Polanish | A46B 1/00 |
| | | | 132/73 |
| 2011/0183296 A1* | 7/2011 | Levine | A61C 5/62 |
| | | | 433/80 |
| 2012/0298131 A1* | 11/2012 | Polanish | A46B 1/00 |
| | | | 132/320 |
| 2013/0036566 A1* | 2/2013 | Schlatter | A46B 5/02 |
| | | | 15/167.1 |
| 2013/0133692 A1 | 5/2013 | Withers et al. | |
| 2013/0137063 A1* | 5/2013 | Edwards | A61C 19/066 |
| | | | 433/215 |
| 2013/0205922 A1 | 8/2013 | Leventhal et al. | |
| 2016/0157595 A1 | 6/2016 | Rajaiah et al. | |
| 2017/0135782 A1 | 5/2017 | Kassab et al. | |
| 2017/0333062 A1* | 11/2017 | Patel | A61B 17/244 |
| 2018/0133119 A1 | 5/2018 | Rajaiah | |
| 2018/0133120 A1 | 5/2018 | Rajaiah | |
| 2018/0133121 A1 | 5/2018 | Rajaiah | |
| 2018/0133122 A1 | 5/2018 | Rajaiah | |
| 2018/0133128 A1 | 5/2018 | Rajaiah | |
| 2018/0133502 A1 | 5/2018 | Rajaiah | |
| 2018/0140516 A1 | 5/2018 | Rajaiah | |
| 2019/0336256 A1* | 11/2019 | Sze | A61C 17/228 |
| 2020/0163441 A1 | 5/2020 | Morrow | |
| 2020/0330340 A1 | 10/2020 | Sagel et al. | |
| 2020/0390534 A1* | 12/2020 | Curtis | A46B 9/005 |
| 2020/0390535 A1* | 12/2020 | Curtis | A61C 19/066 |
| 2021/0361398 A1 | 11/2021 | Wink et al. | |
| 2022/0008182 A1* | 1/2022 | Glen | A46B 11/001 |
| 2022/0061497 A1* | 3/2022 | Bickford | A45D 34/042 |
| 2022/0061513 A1* | 3/2022 | Jungnickel | A46B 15/0093 |
| 2022/0160489 A1* | 5/2022 | Mulrooney | A61C 17/22 |
| 2022/0192437 A1 | 6/2022 | Chang | |
| 2022/0312946 A1* | 10/2022 | Sommer | A46B 5/0095 |
| 2022/0378184 A1 | 12/2022 | Redondo et al. | |

FOREIGN PATENT DOCUMENTS

| | | |
|---|---|---|
| CN | 2832075 Y | 11/2006 |
| CN | 202030135 U | 11/2011 |
| CN | 103040235 A | 4/2013 |
| CN | 107184288 A | 9/2017 |
| CN | 107809924 A | 3/2018 |
| DE | 102011011323 A1 | 8/2012 |
| DE | 202017102284 U1 | 5/2017 |
| EP | 1396209 A1 | 3/2004 |
| EP | 2719356 A1 | 4/2014 |
| EP | 3315171 A1 | 10/2016 |
| FR | 2961669 A1 | 12/2011 |
| FR | 2989868 A1 | 11/2013 |
| GB | 1077143 A | 9/1964 |
| GB | 2138673 A | 10/1984 |
| JP | S54121871 A | 9/1979 |
| JP | H03114741 A | 5/1991 |
| JP | 2001000457 A | 1/2001 |
| JP | 2012217616 A | 11/2012 |
| WO | 2005044129 A2 | 5/2005 |
| WO | 2005112794 A1 | 12/2005 |
| WO | 2008135953 A1 | 11/2008 |
| WO | 2011078864 A1 | 6/2011 |
| WO | 2013050432 A2 | 4/2013 |
| WO | 2015090946 A1 | 6/2015 |
| WO | 2017182239 A1 | 10/2017 |
| WO | 2018033538 A1 | 2/2018 |
| WO | 2020248229 A1 | 12/2020 |
| WO | 2020252503 A1 | 12/2020 |

OTHER PUBLICATIONS

Unpublished U.S. Appl. No. 18/791,928, filed Aug. 1, 2024, Michael David Curtis et al.

PCT Search Report and Written Opinion for PCT/US2020/070136 dated Oct. 14, 2020, 13 Pages.

All Office Actions; U.S. Appl. No. 16/898,469, filed Jun. 11, 2020.

All Office Actions; U.S. Appl. No. 16/898,471, filed Jun. 11, 2020.

* cited by examiner

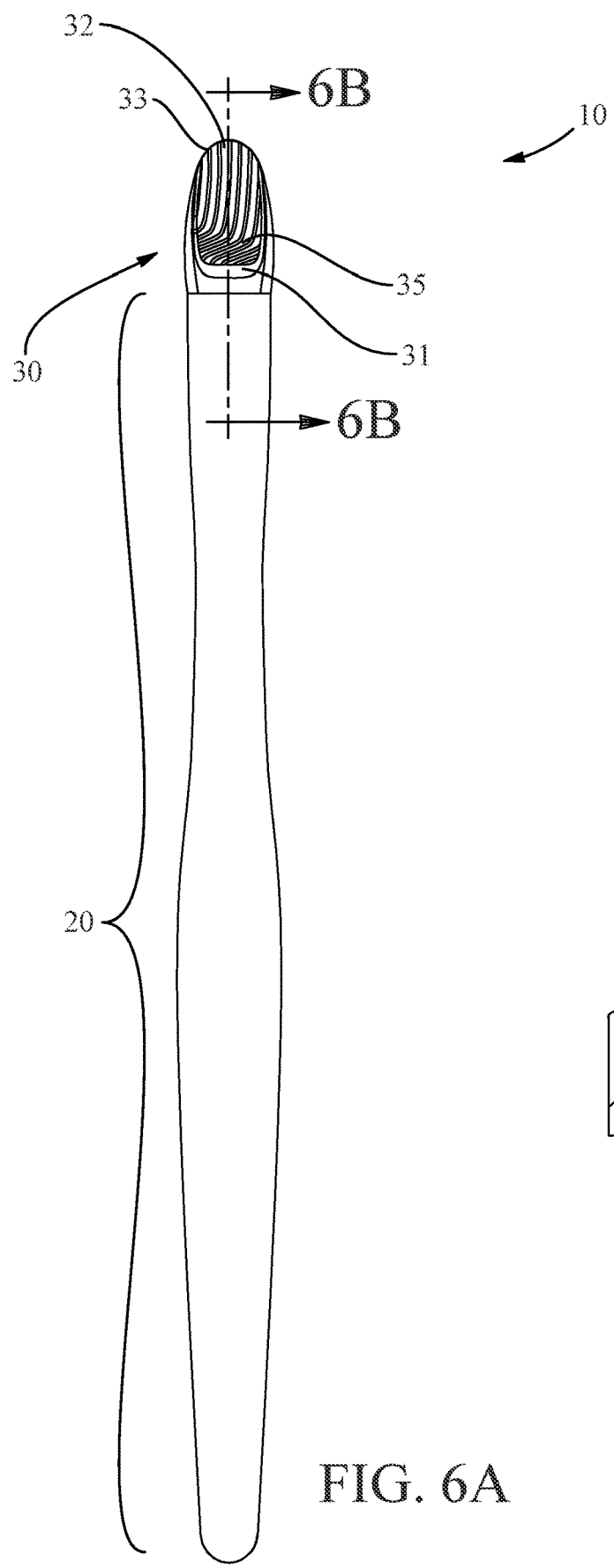
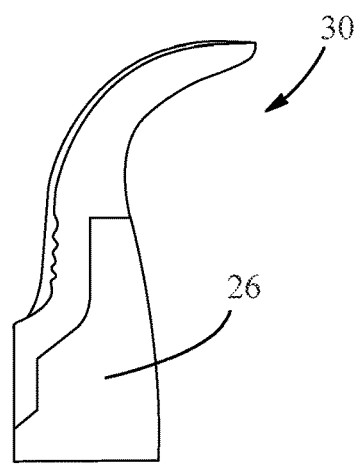
FIG. 6B
FIG. 6A

DEVICE FOR APPLYING EMULSION COMPOSITIONS

FIELD OF THE INVENTION

The present invention is directed to devices for the application of emulsion compositions, such as water-in-oil emulsion compositions, to oral cavity surfaces, such as teeth or gums. The present invention is also directed to devices for the application of hydrophobic compositions to hydrophilic surfaces and/or the application of hydrophilic compositions to hydrophobic surfaces. The present invention is also directed to methods of use of the devices disclosed herein.

BACKGROUND OF THE INVENTION

Active agents have been delivered to the oral cavity using many devices, such as strips, trays, and the like. However, it can be challenging to apply emulsion compositions to many oral cavity surfaces, such as teeth and/or gums. For example, it can be difficult to apply hydrophobic emulsions directly to the hydrophilic surface of wetted teeth due to energetically unfavorable hydrophobic-hydrophilic interactions. Unfortunately, many applicators can lead to low transfer and to streaking and/or inconsistent application.

Some other strategies to deliver emulsion compositions can include trays, strips, or brushes. While dental trays or brushes can be used to apply hydrophobic emulsions, they can be difficult to clean using soap and/or water after use. Strips can be used to deliver emulsion compositions, but are discarded after each use. Additionally, strips can shift in the oral cavity after initial placement and during the application. As such, there is a need for a reusable device that can deliver an emulsion composition with consistent deposition to oral care surfaces.

SUMMARY OF THE INVENTION

Disclosed herein is an applicator tip comprising (a) at least one external ridge; (b) a plurality of internal ridges; and (c) a plurality of internal channels between the plurality of internal ridges, wherein at least a portion of a perimeter of the applicator tip (30) is free from the at least one external ridge (31).

Also disclosed herein is an applicator comprising: (a) an applicator tip, the applicator tip comprising: (i) at least one external ridge; (ii) a plurality of internal ridges; and (iii) a plurality of internal channels between the plurality of internal ridges; and (b) an applicator handle, wherein at least a portion of a perimeter of the applicator tip (30) is free from the at least one external ridge (31).

BRIEF DESCRIPTION OF THE DRAWINGS

FIG. 6A is a top view of an applicator device.
FIG. 6B is a cross sectional view of the applicator device of FIG. 6A.

DETAILED DESCRIPTION OF THE INVENTION

Figure 1A:
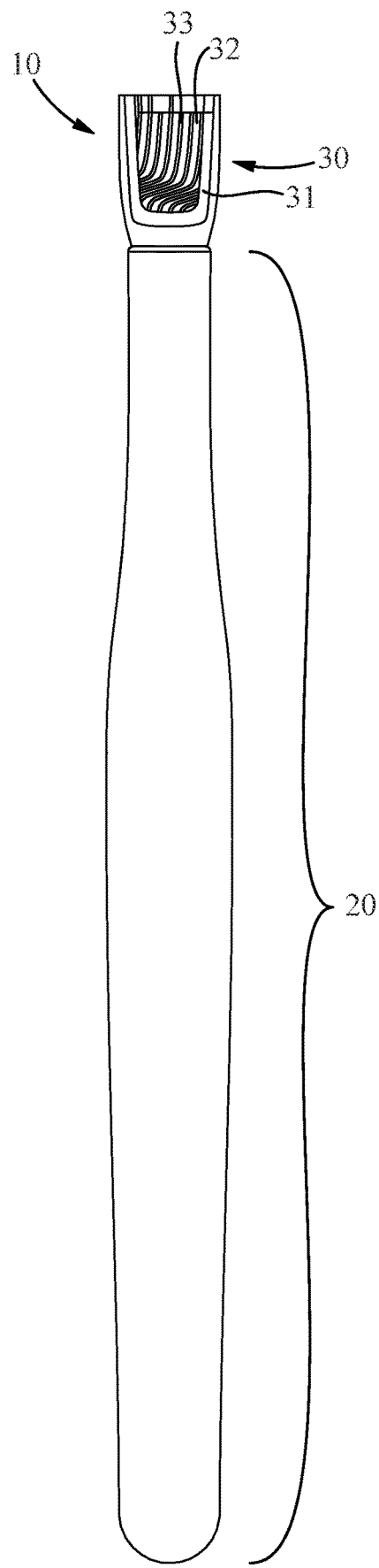
FIG. 1A is a top view of an applicator device.

The present invention is directed to devices for the application of emulsion compositions to oral cavity surfaces, such as teeth or gums. The present invention is directed to devices capable of delivering a hydrophobic composition to a hydrophilic surface.

For example, the emulsion compositions disclosed in U.S. Patent App. No. 2018/0133119 and U.S. Patent App. No. 2018/0133121, which are herein incorporated by reference for their description of the multi-phase oral compositions or emulsion compositions, can be challenging to apply to the hydrophilic surface of wetted teeth. The emulsion compositions disclosed in U.S. Patent App. No. 2018/0133119 and U.S. Patent App. No. 2018/0133121 can be water-in-oil emulsions, with a high proportion of hydrophobic (or "oil" phase) and/or an external hydrophobic phase, which can make application to a hydrophilic surface challenging.

Additionally, water-in-oil emulsion compositions can be difficult to apply with a traditional toothbrush. While, the bristles of a toothbrush can lead to a consistent deposition of the water-in-oil emulsion composition, the emulsion composition can be pushed within the bristles of the toothbrush, which can be difficult to remove and lead to a lower overall transfer rate. Over time, this can lead to an accumulation of unapplied material and can lead to the growth of bacterial or other microbes. Thus, the present invention is directed to devices and methods to effectively apply water-in-oil emulsions to hydrophilic surfaces while maintaining the ability to easily clean the device after each use. Thus, the present invention is directed to an applicator that can spread the water-in-oil emulsion across the surface of teeth, while still maintaining the ability to effectively clean the applicator tip for repeat usage.

Definitions

By "oral care composition", as used herein, is meant a product, which in the ordinary course of usage, is not intentionally swallowed for purposes of systemic administration of particular therapeutic agents, but is rather retained in the oral cavity for a time sufficient to contact dental surfaces or oral tissues. Examples of oral care compositions include dentifrice, tooth gel, subgingival gel, mouth rinse, mousse, foam, mouth spray, lozenge, chewable tablet, chewing gum, tooth whitening strips, floss and floss coatings, breath freshening dissolvable strips, or denture care or adhesive product. The oral care composition may also be incorporated onto strips or films for direct application or attachment to oral surfaces.

The term "dentifrice", as used herein, includes tooth or subgingival-paste, gel, or liquid formulations unless otherwise specified. The dentifrice composition may be a single phase composition or may be a combination of two or more separate dentifrice compositions. The dentifrice composition may be in any desired form, such as deep striped, surface striped, multilayered, having a gel surrounding a paste, or any combination thereof. Each dentifrice composition in a dentifrice comprising two or more separate dentifrice compositions may be contained in a physically separated compartment of a dispenser and dispensed side-by-side.

The term "phase" as used herein means a physically distinct region or regions, which may be continuous or discontinuous, having one or more properties that are different from another phase. Non-limiting examples of properties that may be different between phases include composition, viscosity, solubility, hydrophobicity, hydrophilicity, and miscibility.

The term "multi-phase oral composition" as used herein comprises a mixture of two or more phases that are immiscible with each other, for example such as water in oil emulsions. The phases may be continuous, discontinuous, or combinations thereof. Examples of multi-phase oral compositions include emulsions, such as water in oil emulsions. Examples of multi-phase oral compositions also include oil-in-water emulsions, water-in-oil-in-water emulsions, and oil-in-water-in-oil emulsions. Examples of multi-phase oral compositions also include compositions where the phases are multi-continuous including bi-continuous, layered, striped, marbled, ribbons, swirled, and combinations thereof.

The term "emulsion" as understood herein is an example of a multi-phase composition wherein: 1) at least one of the phases is discontinuous and 2) at least one of the phases is continuous. Examples of emulsions include droplets of water dispersed in oil. In this example the water and oil would be mutually immiscible with each other, water would be the discontinuous phase, and the oil would be the continuous phase.

The term "water-in-oil emulsion" as understood herein is an example of an emulsion wherein 1) the discontinuous phase is aqueous, and 2) the continuous phase is hydrophobic.

The term "aqueous phase" as understood herein is at least one phase that comprises water and an active agent, and is immiscible with the hydrophobic phase. In certain embodiments, each part of the aqueous phase contains at least 2% of the active agent by weight of the aqueous phase. Optionally the aqueous phase may further comprise ingredients that are water soluble, water miscible, or combinations thereof, such as for example water soluble solvents, alcohol, polyethylene glycol, carbopol, etc. or mixtures thereof. In some embodiments, if and when immiscible fillers are added to the aqueous phase, the percentage of the aqueous phase in the composition is calculated by excluding the immiscible filler.

The term "hydrophobic phase" as understood herein means all components of the composition that are immiscible with the aqueous phase. In certain embodiments the hydrophobic phase may further comprise ingredients that are soluble, miscible or combinations thereof in the hydrophobic phase, such as for example hydrocarbon solvents dissolved into the hydrophobic phase, polyethylene dissolved into the hydrophobic phase, microcrystalline wax dissolved into the hydrophobic phase, or mixtures thereof.

By "a sufficient period of time to achieve a benefit," as used herein is meant that the composition is used or worn by the participant or the participant is instructed to use or wear the composition for greater than about 10 seconds; or greater than about 1 minute, such as from about 2.5 minutes to about 12 hours (for example overnight treatment), or from about 3 minutes to about 180 minutes; or greater than about 5 minutes, such as from about 5 minutes to about 60 minutes; or greater than about 10 minutes, such as from about 10 minutes to about 60 minutes; or from about 1, 5, 10, or 15 minutes to about 20, 30, 60, 120 minutes per application; or any other numerical range, which is narrower and which falls within such broader numerical range, as if such narrower numerical ranges were all expressly written herein. In addition, the treatments may be applied from about 1, 2, or 3 times a day to about 4, 5, 6 or 7 times a day. The treatments may be applied for from about 1, 2, 3, 4, 5, 6, or about 7 days to about 8, 9, 10, 11, 12, 13, 14, 21, or 28 days or any other numerical range, which is narrower and which falls within such broader numerical range, as if such narrower numerical ranges were all expressly written herein. In some embodiments the wear time is not the same across different days the treatment is applied. Further, the length of treatment to achieve the desired benefit, for example, tooth whitening, may last for a specified period of time, which may be repeated if necessary, for example from about one day to about six months, in particular from about one day to about 28 days, or from about 7 to about 28 days. The optimal duration and frequency of application will depend on the desired effect, the severity of any condition being treated, the health and age of the user and like considerations.

"Elastomer," as used herein, is defined as a polymer with rubber-like elasticity. An elastomer is a polymer with viscoelasticity, weak intermolecular forces, low Young's modulus, and high failure strain compared with other polymers and materials.

The term "ridge" is used to mean a narrow, raised band of material. A ridge has a long axis and a short axis or height.

The term "about" means that amounts, sizes, formulations, parameters, and other quantities and characteristics are not and need not be exact, but can be approximate and/or larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, preferably within 5% of the reported numerical value.

Several types of ranges are disclosed in the present invention. When a range of any type is disclosed or claimed, the intent is to disclose or claim individually each possible number that such a range could reasonably encompass, including end points of the range as well as any sub-ranges and combinations of sub-ranges encompassed therein.

The foregoing summary is not intended to define every aspect of the invention, and additional aspects are described in other sections. In addition, the invention includes, as an additional aspect, all embodiments of the invention narrower in scope in any way than the variations defined by specific paragraphs set forth herein. For example, certain aspects of the invention that are described as a genus, and it should be understood that every member of a genus is, individually, an aspect of the invention. Also, aspects described as a genus or selecting a member of a genus should be understood to embrace combinations of two or more members of the genus. With respect to aspects of the invention described or claimed with "a" or "an," it should be understood that these terms mean "one or more" unless context unambiguously requires a more restricted meaning. The term "or" should be understood to encompass items in the alternative or together, unless context unambiguously requires otherwise. If aspects of the invention are described as "comprising" a feature, embodiments also are contemplated "consisting of" or "consisting essentially of" the feature.

Features of the compositions and methods are described below. Section headings are for convenience of reading and not intended to be limiting per se. The entire document is intended to be related as a unified disclosure, and it should be understood that all combinations of features described herein are contemplated, even if the combination of features are not found together in the same sentence, or paragraph, or section of this document. It will be understood that any feature of the methods or compounds described herein can be deleted, combined with, or substituted for, in whole or part, any other feature described herein.

Emulsion Compositions

The applicator device, as described herein, is specially adapted for the application of an emulsion composition to an oral cavity surface. The emulsion composition can be an oil-in-water emulsion composition, a water-in-oil emulsion composition, and/or combinations thereof. Emulsion compositions can be applied to the surface of teeth, gums, cheeks, tongue, or any other oral cavity surface.

One example of an emulsion composition that can be deposited to the oral cavity are the water-in-oil emulsion compositions disclosed by U.S. Patent App. No. 2018/0133119 and U.S. Patent App. No. 2018/0133121, which are herein incorporated by reference for their description of the multi-phase oral compositions or emulsion compositions. The water-in-oil emulsion compositions can have an active agent in the aqueous phase or the hydrophobic phase. Suitable active agents include those described in U.S. Patent App. No. 2018/0133119 and U.S. Patent App. No. 2018/0133121. Suitable active agents include bleaching agents, one or more anticalculus agent(s), a fluoride ion source, antimicrobial agent(s), dentinal desensitizing agent(s), anesthetic agent(s), antifungal agent(s), anti-inflammatory agent(s), selective H-2 antagonist(s), anticaries agent(s), nutrient(s), erythritol, probiotics, and mixtures thereof. Specific examples of active agents include, but are not limited to, hydrogen peroxide, fluoride salts, stannous salts, and mixtures thereof. One of the purposes of the water-in-oil emulsion compositions can be to deliver an active agent for a sufficient period of time to achieve a benefit of the active agent. For example, if the active agent is hydrogen peroxide, the composition needs to contact the surface of teeth for a sufficient period of time to whiten the teeth. If the active agent is stannous fluoride, the composition needs to contact the surface of teeth and/or gums for a sufficient period of time to deposit stannous ions and/or fluoride ions to provide an antigingivitis, antisensitivity, and/or anticaries benefit.

The emulsion composition can have a cone penetration value of from about 100 to about 300, preferably in the range from about 150 to about 250, and more preferably in the range of from about 170 to about 200 or any other numerical range, which is narrower and which falls within such broader numerical range, as if such narrower numerical ranges were all expressly written herein, as measured according to ASTM method D937-07. Without being bound by theory, the cone penetration consistency value of the water-in-oil emulsion composition may be a factor to ensure that the water-in-oil emulsion composition: 1) is substantive and does not run down the teeth or run out of the delivery carrier during application or during use; and 2) releases an effective amount of the bleaching agent or active agent during use. Specifically, if the cone penetration consistency value of the water-in-oil emulsion composition is too high, the water-in-oil emulsion composition may not be substantive and run down the teeth or run out of the delivery carrier during application or during use. In contrast, if the cone penetration consistency value of the water-in-oil emulsion composition is too low, the water-in-oil emulsion composition may not release an effective amount of the bleaching agent or active agent during use.

Teeth wetted with saliva present a unique challenge for the deposition of water-in-oil emulsion compositions. Wetted teeth are a hydrophilic surface. Many water-in-oil emulsion compositions have a high hydrophobic character and/or the hydrophobic phase as the external phase. Thus, it can be challenging to deposit a hydrophobic composition onto a hydrophilic surface.

Other Compositions

While specific reference is made herein to the application of emulsion compositions, hydrophobic compositions, and/or water-in-oil emulsion compositions, the applicator devices described herein can also be used to apply a variety of other compositions, such as the jammed emulsions of U.S. Provisional Application No. 62/838,350, the compositions of PCT/CN2019/091272, the compositions of U.S. Provisional Application No. 62/834,625, or any other oral care composition that can be applied directly to an oral cavity surface.

Applicator Device (10)

The applicator device (10) described herein, can be designed to spread the emulsion composition across oral cavity surfaces. Additionally, the applicator device (10) described herein, can be designed to contain the emulsion composition and facilitate the transfer of the emulsion composition by preventing the material from spilling during the application. Moreover, the applicator device (10) described herein, can be made from a material that can facilitate the transfer of the emulsion composition to the targeted oral cavity surface and have properties to promote comfort to users during application. As such, the applicator device (10) can comprise an applicator handle (20) suitable for self-application and an applicator tip (30) at least one of (a) at least one external ridge; (b) a plurality of internal ridges; and/or (c) a plurality of internal channels between the plurality of internal ridges.

Applicator Handle (20)

The applicator handle (20) can be sized for use in self-application or sized for application by dental professional. The applicator handle (20) can be straight or substantially straight. The applicator handle (20) can also be curved, angled, or bendable to facilitate application to hard to reach oral care surfaces, such as tooth surfaces in the back of the oral cavity.

The applicator handle (20) can be made from any suitable material, such as for example, a polymer, a polymer alloy, an elastomer, a metal, a metal alloy, glass, and/or combinations thereof. The applicator handle (20) can have gripping elements or aesthetic elements. The applicator handle (20) can be opaque, translucent, transparent, and/or combinations thereof.

Suitable polymer materials include, but are not limited to, polypropylene, polyethylene, polyethylene terephthalate, and/or combinations thereof.

The applicator handle (20) can have a shore durometer rating of from about 70 D to about 90 D, from 75 D to about 85 D, from about 77 D to about 83 D, from about 45 A to about 75 A, from about 50 A to about 80 A, from about 50 A to about 70 A, or from about 60 A to about 80 A. The applicator handle (20) can have a shore durometer rating that is greater than the shore durometer rating of the applicator tip (30) so that the applicator tip (30) will be flexible within the oral cavity. The durometer rating can be determined by ASTM Test No. D2240, which is herein incorporated by reference.

Figure 2A:
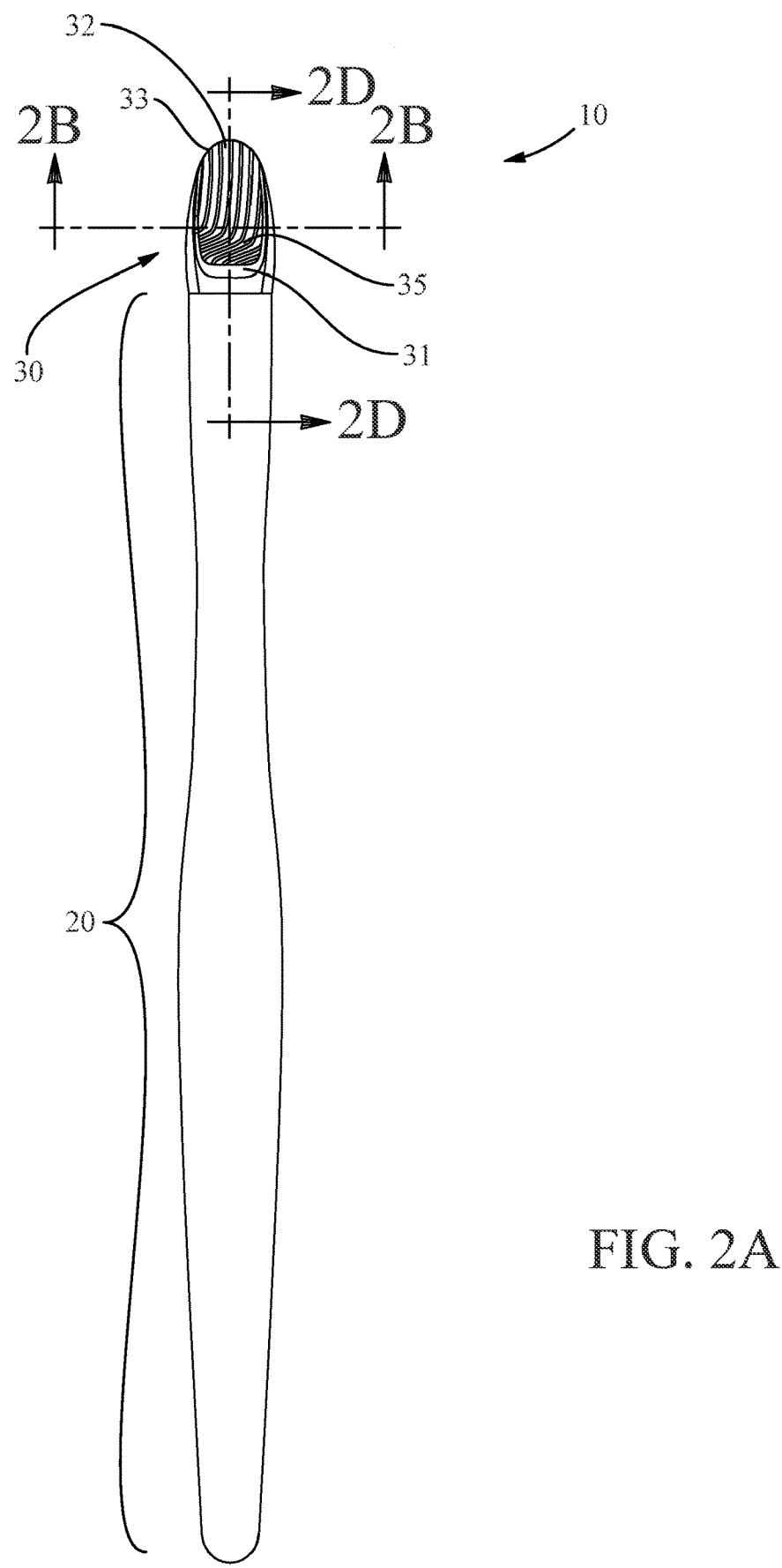
FIG. 2A is a top view of an applicator device.
Figure 2B:
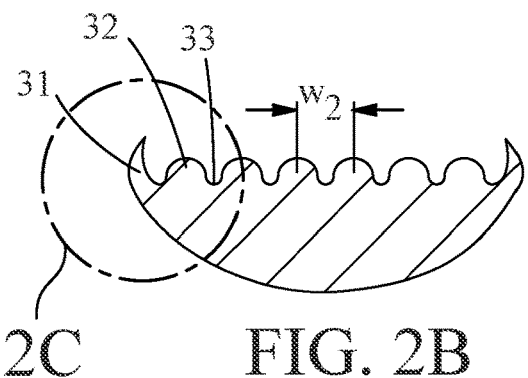
FIG. 2B is a cross sectional view of the applicator device of FIG. 2A.
Figure 2C:
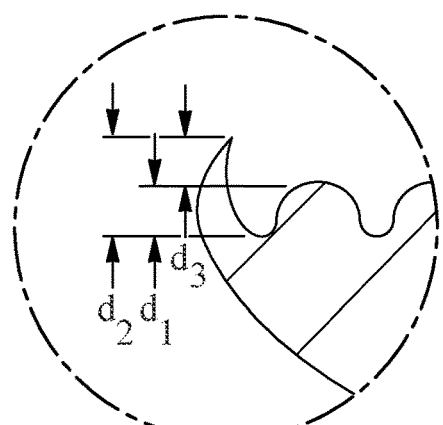
FIG. 2C is a magnified view of a portion of the cross-sectional view of FIG. 2B
Figure 2D:
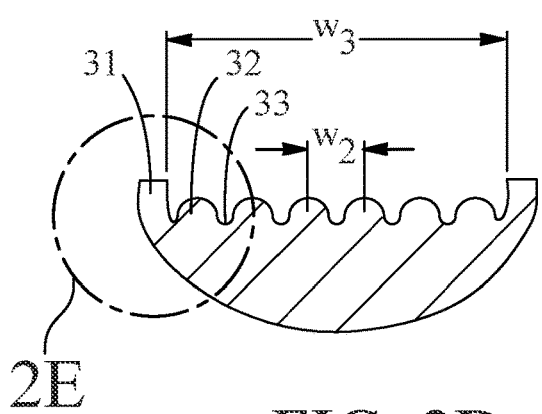
FIG. 2D is an alternative cross-sectional view of the applicator tip of the applicator device of FIG. 2A.
Figure 2E:
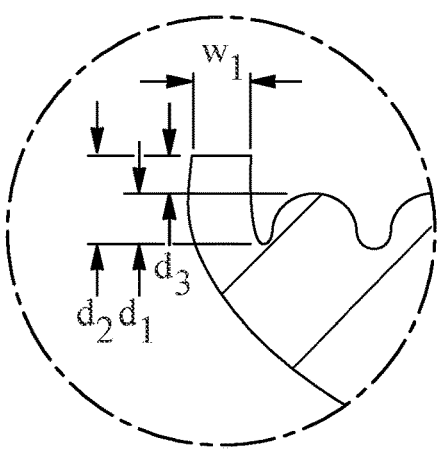
FIG. 2E is a magnified view of a portion of the cross-sectional view of FIG. 2D
Figure 2F:
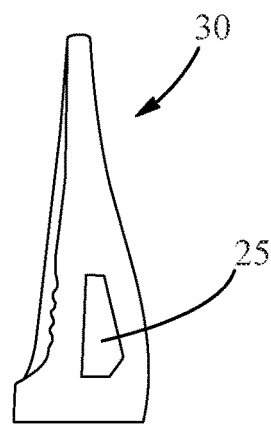
FIG. 2F is a cross sectional view of the applicator device of FIG. 2A.

As in FIG. 2F, the applicator handle (20) can have an applicator insert (25) that can fit within a void in the applicator tip (30) to assist in the connection between the tip (30) and the handle (20) and/or provide a platform to resist the flexibility of the applicator tip (30), which can increase application precision, accuracy, and/or comfort.

As in FIG. 6B, the applicator handle (20) can have an applicator posterior support (26) that can assist in the connection between the tip (30) and the handle (20) and/or provide a platform to resist the flexibility of the applicator tip (30), which can increase application precision, accuracy, and/or comfort.

The applicator tip (30) can be reversibly attached to the applicator handle (20) using any suitable means, such as the connector disclosed in U.S. Patent Application Publication No. 2019/0246780, which is herein incorporated by reference in its entirety.

Applicator Tip (30)

As described herein, the applicator tip (30) can be designed to facilitate transfer of an emulsion composition from the applicator tip to an oral care surface. For example, the applicator tip (30) can be specifically designed to deliver a substantially hydrophobic composition to a hydrophilic surface, such as wetted teeth.

The applicator tip (30) can be made from a material that is suitable for application to oral care surfaces. For example, the applicator tip (30) can be made from food & drug grade materials, materials on the GRAS (Generally Regarded As Safe) list, or other applicable materials approved for use within the oral cavity according to local laws.

The applicator tip (30) can be made from any suitable material, such as for example, a polymer, a polymer alloy, an elastomer, a metal, a metal alloy, glass, and/or combinations thereof.

Suitable polymer materials include, but are not limited to, polypropylene, polyethylene, polyethylene terephthalate, and/or combinations thereof.

Suitable elastomer materials include, but are not limited to, thermoplastic elastomers, a styrenic, a copolyester, a polyurethane, a polyamide, a polyolefin blend, a polyolefin alloy, a reactor TPO, a polyolefin plastomer, a polyolefin elastomer, and/or combinations thereof. Suitable elastomers include, for example, an elastomer made from PolyOne® under the Versaflex™ or Dynaflex™ product lines, from Hapco, Inc under the Steralloy™ product line, or from United Soft Plastics under the Unisoft Standard SEBS-based thermoplastic elastomer.

The applicator tip (30) can have a shore durometer rating of from about 25 A to about 90 A, from about 40 A to about 85 A, from about 45 A to about 75 A, or from about 60 A to about 70 A.

The applicator tip (30) for the applicator device may have a longitudinal axis/extension being defined as the axis/extension between a proximal end and a distal end of the applicator tip (30). As described herein, the term "proximal end" means the end of the applicator tip (30) which may be attached or attachable to the applicator handle (20) of the applicator device (10), whereas the term "distal end" means the end of the applicator tip (30) being opposite the proximal end, i.e. being furthest away from the applicator handle (20)/at the loose/free end of the applicator tip (30). A longitudinal application direction is defined by an applicator movement in the direction towards the distal end or towards the proximal end of the applicator tip (30), i.e. along the longitudinal extension of the applicator tip (30).

The applicator tip (30) can extend from the applicator handle (20) and may be either repeatedly attachable to and detachable from the applicator handle (20), or the applicator tip (30) may be non-detachably connected to the applicator handle (20).

The applicator tip (30), as described herein, comprises at least one external ridge (31). The at least one external ridge (31) can lie along at least a majority of the perimeter of the applicator tip (30) such that the at least one external ridge (31) forms an internal cavity (35) for the emulsion composition to be placed in.

The height of the at least one external ridge (31) can be greater at the proximal end of the applicator tip (30) and be smaller at the distal end of the applicator tip (30). The at least one external ridge (31) can be continuous and surround the entire perimeter of the applicator tip (30). The at least one external ridge (31) can be a continuous or discontinuous ridge surrounding from about 25% to about 95%, from about 33% to about 90%, or from about 40% to about 80% of the perimeter of the applicator tip (30). Leaving a portion of the perimeter of the applicator tip (30) free from an external raised member, such as the at least on external ridge (31) can allow for the emulsion composition to be accurately and efficiently transferred from the applicator tip (30) to the oral cavity surface without trapping emulsion composition within the internal cavity (35). The free portion of the perimeter can allow the emulsion composition to flow out of the applicator tip. The at least one external ridge (31) can extend in an equal distances in either direction from the distal end of the applicator tip (30).

The applicator tip (30), as described herein, comprises a plurality of internal ridges (32). The plurality of internal ridges (32) extend in a direction at least substantially parallel or parallel to the longitudinal axis of the applicator device (10). In contrast, the bristles of a toothbrush are at least substantially perpendicular or perpendicular to the longitudinal axis of the toothbrush.

At least a portion of the plurality of internal ridges (32) can be straight or at least substantially straight. At least a portion of the plurality of internal ridges (32) can be curved. At least a portion of the plurality of internal ridges (32) can be a combination of straight or at least substantially straight portions and curved portions. The plurality of internal ridges (32) can be equally spaced or unequally spaced across the surface of the applicator.

At least a portion of the plurality of internal ridges (32) can terminate at the superior edge or within about 1 mm, within about 5 mm, or within about 10 mm of the superior edge of the applicator tip (30). All of the plurality of internal ridges (32) can terminate at the superior edge or within about 1 mm, within about 5 mm, or within about 10 mm of the superior edge of the applicator tip (30).

The applicator tip (30), as described herein, comprises a plurality of internal channels (33) that are between the plurality of internal ridges (32). The width of the internal channels (33) can be identical or vary in size. The plurality of internal ridges (32) and plurality of internal channels (33) facilitate the transfer and spreading of an emulsion composition to an oral cavity surface similar to a trowel with mortar. The plurality of internal channels (33) can allow for emulsion composition to evenly spread along the surface of wetted teeth. The plurality of internal ridges (32) and plurality of internal channels (33) can be easier to remove any remaining emulsion composition after application because the plurality of ridges (32) are fixed in location, unlike toothbrush bristles, and can not stick together. Thus, the emulsion composition can be more easily wiped or rinsed away.

The plurality of internal ridges (32) can comprise from 2 to about 20, from about 5 to about 15, or from about 3 to about 25 of internal ridges. The plurality of internal channels (33) can comprise from 2 to about 20, from about 5 to about 15, or from about 3 to about 25 of internal channels. The at least one external ridge (31) can comprise 1, 2, 3, or more external ridges that surround at least a majority of the perimeter of the applicator tip (30).

The plurality of internal ridges (32) can be smaller in height than the at least one external ridge (31). The difference in height between the plurality of internal ridges (32) and the at least one external ridge (31) can form the internal cavity (35) of the applicator tip (30) for the placement of the emulsion composition.

The height of each of the plurality of the internal ridges (32) can be identical or they can vary along the surface of the applicator tip (30). The volume of each of the plurality of internal channels (33) can be identical or they can vary along the surface of the applicator tip (30). For example, the volume of the plurality of internal channels (33) can be greater towards the middle of the applicator tip (30) and less approaching the at least one external ridge (31).

The applicator tip (30) can be clear, transparent, translucent, and/or opaque. The applicator tip (30) can be colored to allow the user to easily see the emulsion composition on the applicator tip. The applicator tip (30) and the emulsion composition can be different colors, contrasting colors, or either the applicator tip (30) or the emulsion composition can be colored so that the applicator tip and the emulsion composition can be easily distinguished by the user during application to an oral cavity surface.

The distance, $d_1$ in FIGS. 2B and 2C, from the valley of the internal channel (34) of the plurality of internal channels (33) to the peak of the plurality of the internal ridges (33) can be from about 0.001 mm to about 1 mm, from about 0.01 mm to about 0.5 mm, or from about 0.02 mm to about 0.4 mm. The distance, $d_1$ in FIGS. 2B and 2C, from the valley of the internal channel (34) of the plurality of internal channels (33) to the peak of the plurality of the internal ridges (33) can be consistent throughout the entire tip or $d_1$ can vary longitudinally, latitudinally, or from the distal end to the proximal end of the applicator tip (30).

The distance, $d_2$ in FIGS. 2B and 2C, from the valley of the internal channel (34) of the plurality of internal channels (33) to the peak of the at least one external ridge (31) can be from about 0.01 mm to about 1.0 mm, from about 0.1 mm to about 0.9 mm, or from about 0.25 mm to about 0.75 mm. The distance, $d_2$ in FIG. 2C, from the valley of the internal channel (34) of the plurality of internal channels (33) to the peak of the at least one external ridge (31) can be consistent throughout the entire tip (30) or $d_2$ can vary longitudinally, latitudinally, or from the distal end to the proximal end of the applicator tip (30).

The depth, $d_3$ in FIGS. 2B and 2C, of the internal cavity (35), can be from 0 to about 5 mm, from 0 to about 2.0 mm, up to about 1.5 mm, up to about 1.25 mm, from about 0.01 mm to about 2.0 mm, or from about 0.1 mm to about 2.0 mm. The depth of the internal cavity (35), $d_3$, can be consistent throughout the applicator tip (30) or $d_3$ can vary longitudinally, latitudinally, or from the distal end to the proximal end of the applicator tip (30).

The width of the at least one external ridge (31), $W_1$ in FIG. 2C, can be from about 0.10 mm to about 2.5 mm, from about 0.25 mm to about 2.2 mm, or from about 0.35 mm to about 2.2 mm. The at least one external ridge (31) can be flat with a width (i.e. a plateau) as in FIG. 2C, be a peak as in FIG. 2B, and/or rounded.

The width between two internal ridges of the plurality of internal ridges (32), $W_2$ in FIG. 2C, can be from about 0.01 to about 2.0 mm, from about 0.10 mm to about 1.5 mm, or from about 0.25 mm to about 1 mm.

The width of the internal cavity (35), $W_3$ in FIG. 2C, can be from about 1.0 mm to about 10 mm, from about 4.0 mm to about 9.0 mm, or from about 5.0 mm to about 8.0 mm.

The volume of the space between the at least on external ridge (31) along the surface of the applicator tip (30) can be known as the pocket volume of the applicator tip (30). The applicator tip (30) can have a pocket volume of from about 5 $mm^3$ to about 50 $mm^3$, from about 10 $mm^3$ to about 25 $mm^3$, or from about 10 $mm^3$ to about 20 $mm^3$.

Figure 1B:
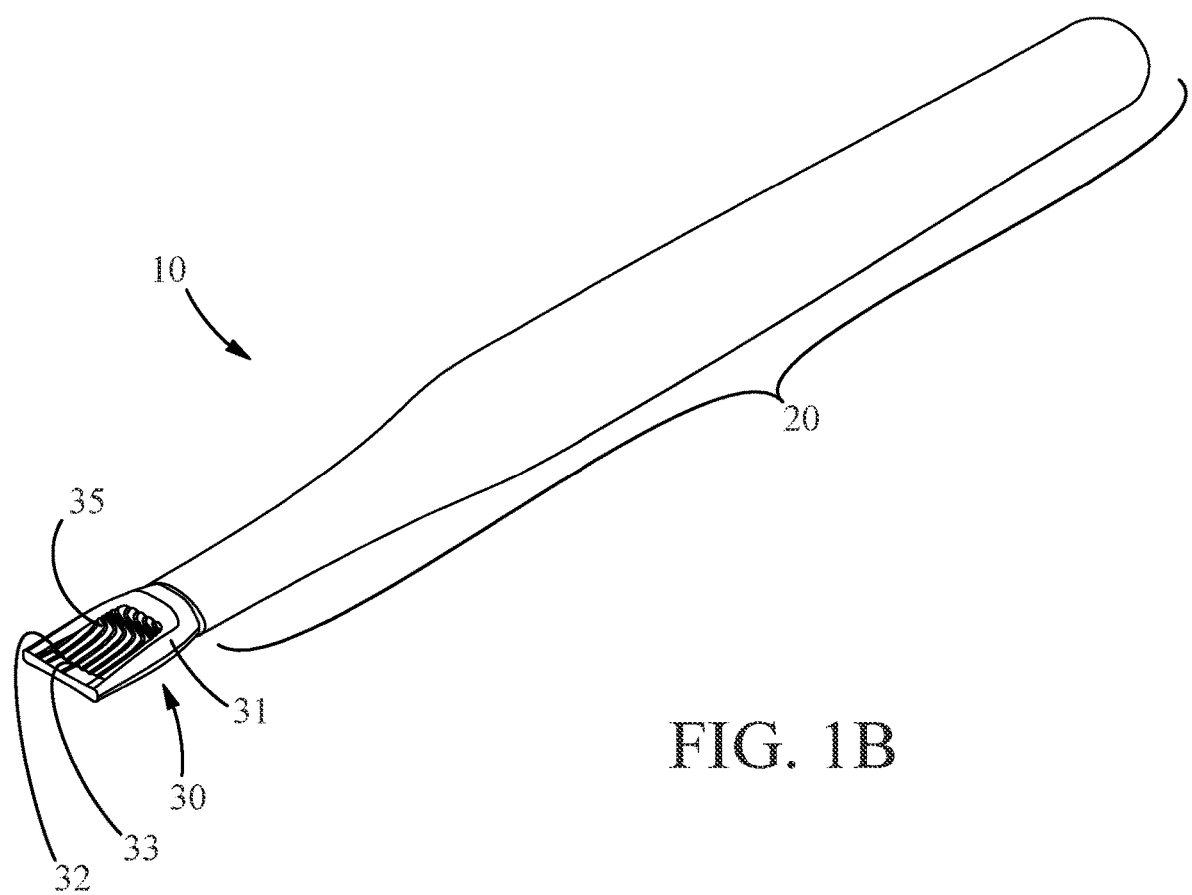
FIG. 1B is a perspective view of the applicator device of FIG. 1A.

As shown in FIG. 1A and FIG. 1B, the applicator device (10) can have a handle (20) and an applicator tip (30). The applicator tip (30) can have at least one external ridge (31). In one embodiment, as shown in FIGS. 1A and 1B, the at least one external ridge (31) comprises a single ridge in a "U" shape running from one end of the distal end of the applicator tip (30) to the opposite end of the distal end of the applicator tip (30). In one embodiment, as shown in FIGS. 1A and 1B, the plurality of internal ridges (32) have a straight portion and a curved portion. Additionally, in one embodiment, as shown in FIGS. 1A and 1B, the distal end of the applicator tip (30) is straight.

In one embodiment, as shown in FIG. 2A, the distal end of the applicator tip (30) can be curved, which can increase application precision, accuracy, and/or comfort.

FIG. 2B is a cross-sectional view of the applicator tip (30) of FIG. 2A. As shown in FIG. 2C, the applicator tip (30) can comprise at least one external ridge (31), a plurality of internal ridges (32), and a plurality of internal channels (33) between the plurality of internal ridges.

FIG. 2C is an alternative cross-sectional view of the applicator tip (30) of FIG. 2A. As shown in FIG. 2C, the applicator tip (30) can comprise at least one external ridge (31), a plurality of internal ridges (32), and a plurality of internal channels (33) between the plurality of internal ridges.

FIG. 2D is a cross-sectional view of FIG. 2A. In one embodiment, the applicator tip (30) can have an applicator insert (25) to assist in connecting the applicator tip (30) to the applicator handle (20) and/or assist in the application of the emulsion composition.

Figure 3A:
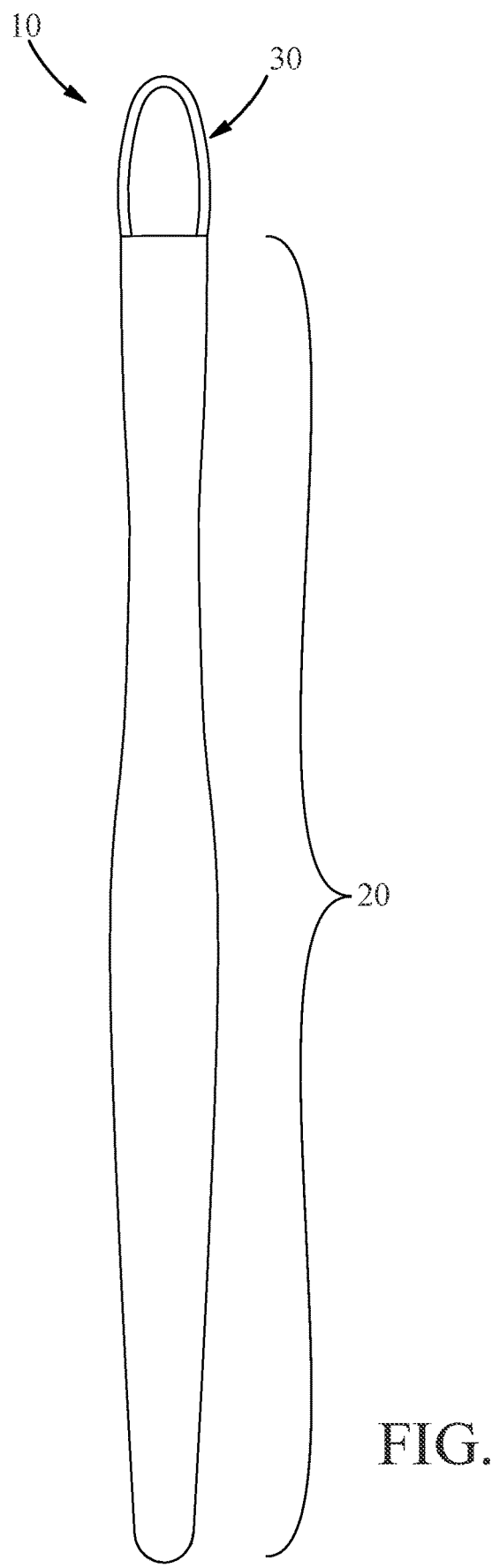
FIG. 3A is a top view of a comparative applicator device.
Figure 3B:
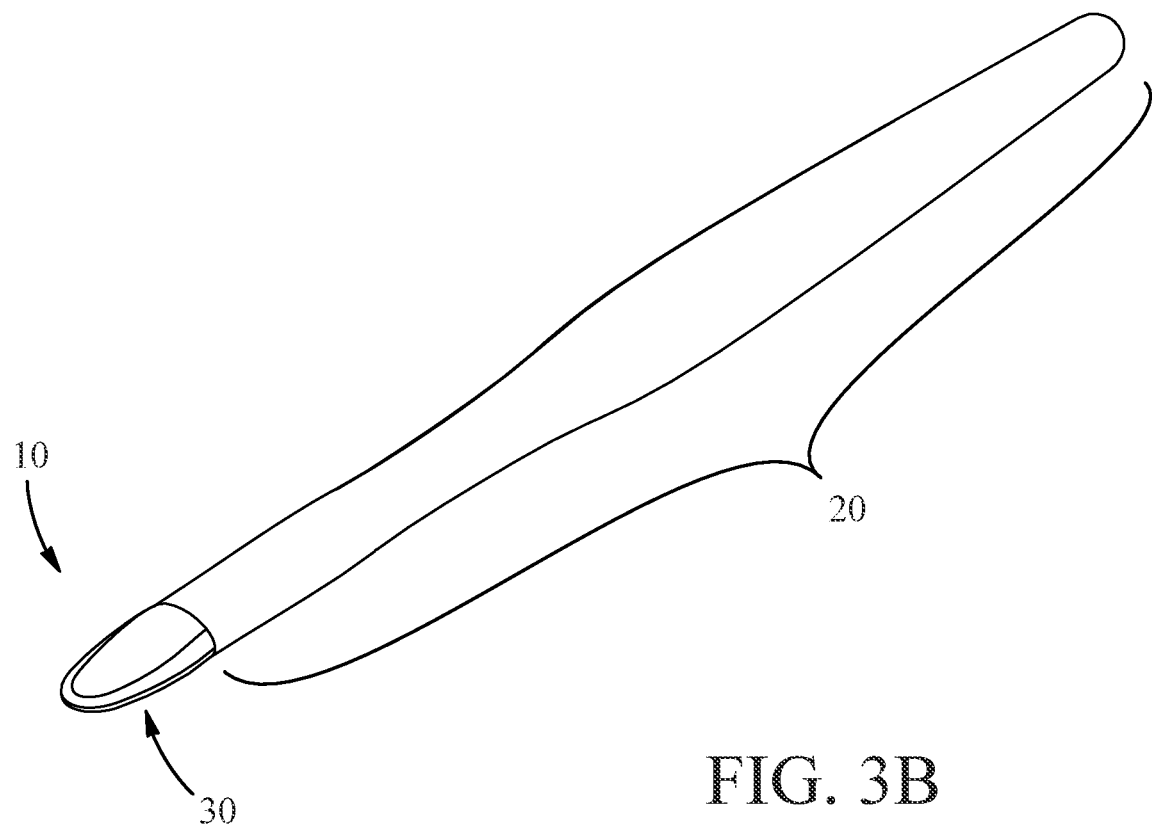
FIG. 3B is a perspective view of the comparative applicator device of FIG. 3A.

FIG. 3A and FIG. 3B demonstrate a comparative applicator device (10) that do not have a plurality of internal ridges (32) or a plurality of internal channels (33) between the plurality of internal ridges.

FIG. 6A and FIG. 6B demonstrate an applicator device (10) that has an applicator posterior support (26) that can adjust the flexibility of the applicator tip (10).

EXAMPLES

The invention is further illustrated by the following examples, which are not to be construed in any way as imposing limitations to the scope of this invention. Various other aspects, modifications, and equivalents thereof which, after reading the description herein, may suggest themselves to one of ordinary skill in the art without departing from the spirit of the present invention or the scope of the appended claims.

Applicator devices were screened for the evenness of the application of an emulsion composition to a tooth surface and percentage of emulsion composition transferred to the tooth surface from a given applicator using an in vivo model. A blue dye was added to the emulsion composition to facilitate visual and quantitative analysis of the various applicator devices.

A common toothbrush was evaluated as compared to applicator device FIG. 2A to illustrate percent of transfer of emulsion complex onto the tooth surface noted as transfer efficiency. This was accomplished by loading 0.15-0.25 g of the emulsion composition onto each described implement. The transfer efficiency of TABLE 1 was determined by comparing the weight of the implement prior to application and after application. As shown in TABLE 1, the applicator device FIG. 2A illustrated significantly higher transfer of the emulsion complex onto the front teeth surfaces.

TABLE 1

| In vivo percent transfer of emulsion composition onto teeth | |
|---|---|
| Applicator | Transfer Efficiency (SD) |
| FIG. 2A | 75.08% (2.62) |
| Toothbrush | 20.86% (4.61) |

Next, ~7.5 mg of the emulsion composition was loaded onto the applicator devices of FIG. 2A and FIG. 3A and test subjects were asked to either vertically or horizontally apply the emulsion composition directly to their upper teeth. The test subjects were asked to do two successive applications for a 15 second period each applying the emulsion composition to the top 6 front teeth covering central incisors, lateral incisors and canines. The evenness of each applicator device was determined by performing an image color assessment on the teeth prior to application and after application. Evenness of application was assessed subjectively with 8 or more graders who evaluated images and graded on a scale of 0-5 with five being very even application.

Figure 4:
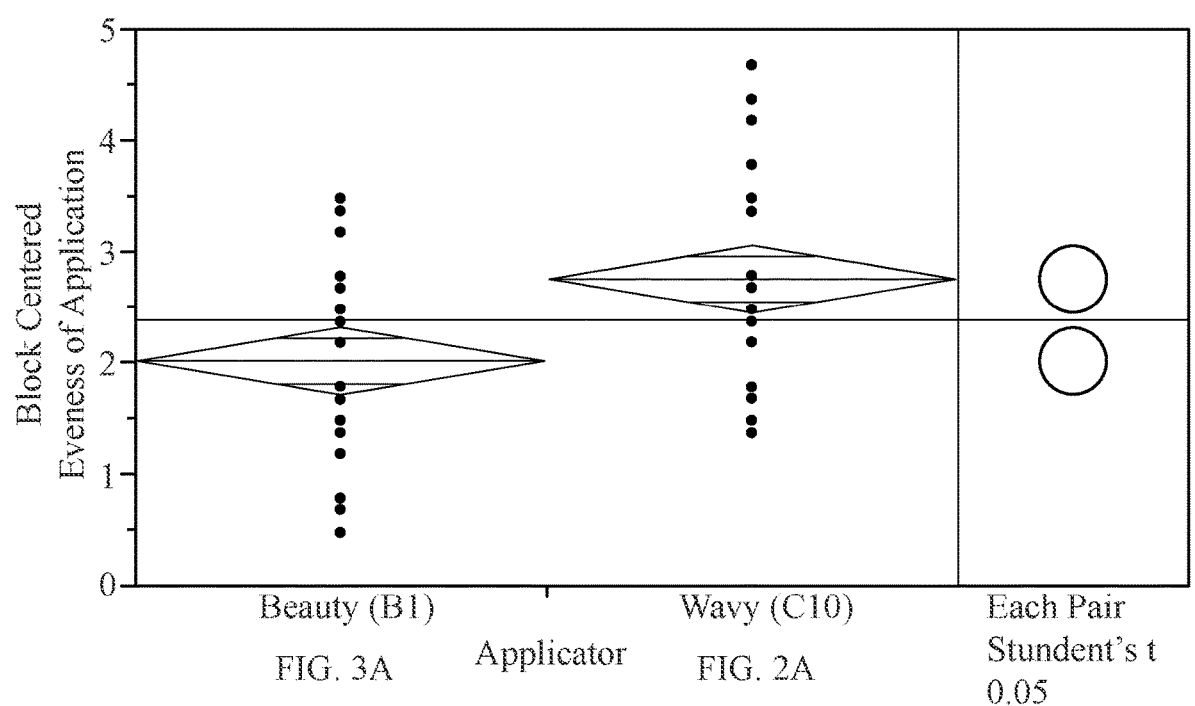
FIG. 4 is a graph showing the evenness of application using the applicator device of FIG. 2A-C and FIG. 3A-B when applied horizontally.
Figure 5:
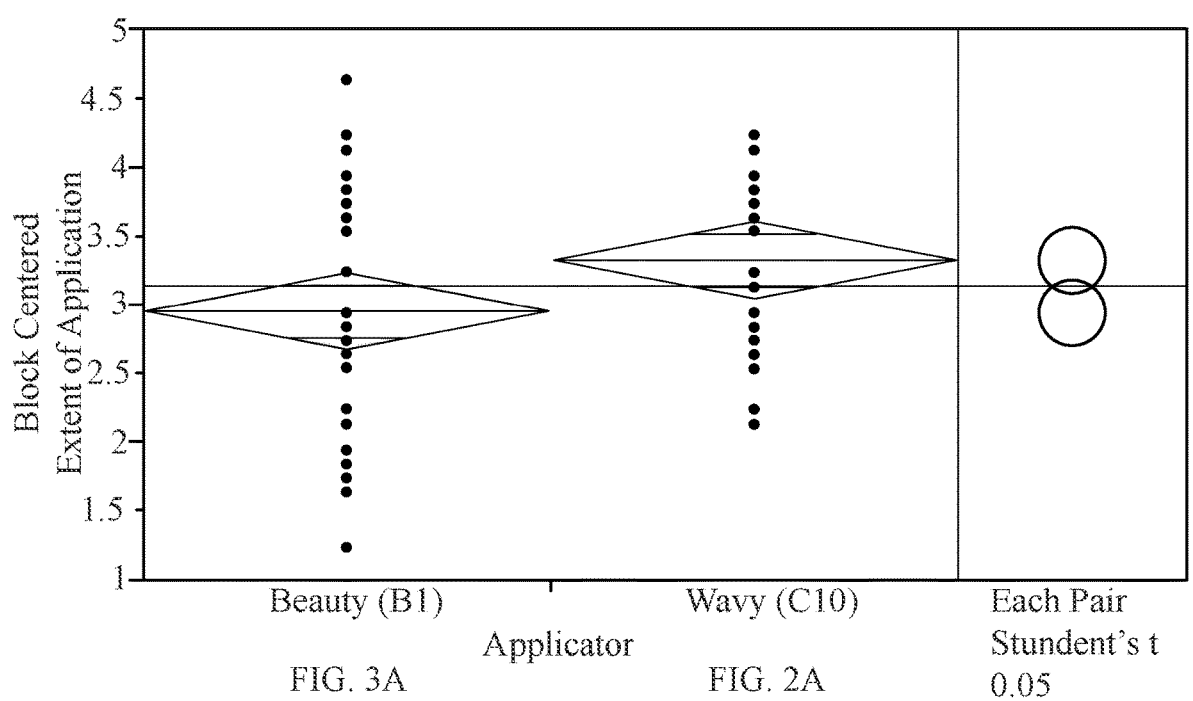
FIG. 5 is a graph showing the evenness of application using the applicator device of FIG. 2A-C and FIG. 3A-B when applied vertically.

As shown in FIG. 4, the applicator device of FIG. 2A led to a statistically higher evenness of application. FIG. 5 shows that the evenness of application was higher with the applicator device of FIG. 2A regardless of whether the test subjects were instructed to apply the emulsion composition vertically or horizontally. For example, the applicator device of FIG. 2A led to an evenness of application of 2.74 when applied horizontally and an evenness of application of 2.71 when applied vertically. In contrast, the applicator device of FIG. 3A led to an evenness of application of 2.00 when applied horizontally and an evenness of application of 2.29 when applied vertically, as shown in TABLE 2.

TABLE 2

| | Evenness of Application | |
|---|---|---|
| Applicator | Horizontally Applied (SD) | Vertically Applied (SD) |
| FIG. 2A | 2.74 (0.15) | 2.71 (0.18) |
| FIG. 3A | 2.00 (0.15) | 2.29 (0.18) |

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An oral applicator for application of an oral care composition to an oral cavity comprising:
    (a) an applicator tip for applying the oral care composition to a tooth and a gum of the oral cavity comprising:
        (i) a continuous external ridge, wherein the continuous external ridge lies along a majority of a perimeter of the applicator tip including a proximal portion of the perimeter of the applicator tip, and at least a distal portion of the perimeter of the applicator tip is free from the continuous external ridge;
        (ii) a plurality of internal ridges, wherein each of the plurality of internal ridges is inside the perimeter of the applicator tip, and wherein a majority of the plurality of internal ridges extend to the perimeter of the applicator tip; and
        (iii) a plurality of internal channels between the plurality of internal ridges,
        wherein a difference in height between the plurality of internal ridges and the continuous external ridge forms an internal cavity above the plurality of internal ridges and the plurality of internal channels, wherein the internal cavity is configured to hold the oral care composition for application, and
        wherein the applicator tip has a durometer rating of from about 45 A to about 75 A; and
    (b) an applicator handle, wherein the applicator handle is detachably or non-detachably connected to a proximal end of the applicator tip.

2. The oral applicator of claim 1, wherein the application tip is colored.

3. The oral applicator of claim 1, wherein a portion of the plurality of internal ridges are substantially straight along a longitudinal axis of the applicator tip.

4. The oral applicator of claim 1, wherein a portion of the plurality of internal ridges are curved along a longitudinal axis of the applicator tip.

5. The oral applicator of claim 1, wherein a first portion of the plurality of internal ridges are substantially straight along a longitudinal axis of the applicator tip and a second portion of the plurality of internal ridges are curved along the longitudinal axis of the applicator tip.

6. The oral applicator of claim 1, wherein the plurality of internal ridges comprises from 2 to about 20 internal ridges.

7. The oral applicator of claim 1, wherein the continuous external ridge comprises a plateau.

8. The oral applicator of claim 1, wherein the applicator tip is made from an elastomer.

9. The oral applicator of claim 8, wherein the elastomer comprises a thermoplastic elastomer, a styrenic, a copolyester, a polyurethane, a polyamide, a polyolefin blend, a polyolefin alloy, a reactor thermoplastic polyolefin, a polyolefin plastomer, a polyolefin elastomer, or combinations thereof.

10. The oral applicator of claim 1, wherein one of the plurality of internal channels comprises a valley, and wherein a first distance from the valley to a peak of the continuous external ridge is greater than a second distance from the valley to a peak of one or more of the plurality of internal ridges.

11. The oral applicator of claim 1, wherein a width between two adjacent internal ridges of the plurality of internal ridges is greater than a height of either of the two adjacent internal ridges.

12. The oral applicator for application of an oral care composition to an oral cavity comprising:
   (a) an applicator tip for applying the oral care composition to a tooth and a gum of the oral cavity comprising:
      (i) an upper surface having a perimeter;
      (ii) a proximal end and a distal end;
      (iii) a left side and a right side, wherein the left side and the right side each extend longitudinally between the proximal end and the distal end;
      (iv) a continuous external ridge on the upper surface extending from the proximal end along the left side and the right side, wherein the continuous external ridge lies along a majority of the perimeter and at least a distal portion of the perimeter is from the continuous external ridge;
      (v) a plurality of internal ridges on the upper surface, wherein each of the plurality of internal ridges is inside the perimeter of the upper surface, and wherein a portion of the plurality of internal ridges extend from the continuous external ridge to the perimeter; and
      (vi) a plurality of internal channels between the plurality of internal ridges,
      wherein a difference in height between the plurality of internal ridges and the continuous external ridge forms an internal cavity above the plurality of internal ridges and the plurality of internal channels, wherein the internal cavity is configured to hold the oral care composition for application; and
   (b) an applicator handle, wherein the applicator handle is detachably or non-detachably connected to the proximal end of the applicator tip.

13. The oral applicator of claim 12, wherein the applicator tip is made from an elastomer and has a durometer rating of from about 45 A to about 75 A.

14. The oral applicator of claim 12, wherein a majority of the plurality of internal ridges extend from the continuous external ridge to the perimeter.

15. The oral applicator of claim 12, wherein the internal cavity extends from the left side to the right side.

16. The oral applicator of claim 12, wherein a height of the continuous external ridge is greater than a height of any of the plurality of internal ridges.

17. The oral applicator of claim 12, wherein a height of the continuous external ridge tapers from the proximal end towards the distal end.

18. The oral applicator of claim 12, wherein a width between two adjacent internal ridges of the plurality of internal ridges is greater than a height of either of the two adjacent internal ridges.

19. The oral applicator of claim 12, wherein one of the plurality of internal channels comprises a valley, and wherein a first distance from the valley to a peak of the continuous external ridge is greater than a second distance from the valley to a peak of one or more of the plurality of internal ridges.

* * * * *